US010975939B2

(12) United States Patent
Ryeland et al.

(10) Patent No.: US 10,975,939 B2
(45) Date of Patent: Apr. 13, 2021

(54) ENDLESS DRIVE ARRANGEMENT AND IMPROVED TWO-ARMED TENSIONING SYSTEM FOR SAME

(71) Applicant: LITENS AUTOMOTIVE PARTNERSHIP, Woodbridge (CA)

(72) Inventors: Geoffrey W. Ryeland, North York (CA); Ron Farewell, Mississauga (CA); Andrew M. Boyes, Aurora (CA); Thelma Neudorf, Brampton (CA); Jason R. Desouza-Coelho, Markham (CA); John R. Antchak, Aurora (CA)

(73) Assignee: Litens Automotive Partnership, Woodbridge (CA)

( * ) Notice: Subject to any disclaimer, the term of this patent is extended or adjusted under 35 U.S.C. 154(b) by 192 days.

(21) Appl. No.: 15/696,994

(22) Filed: Sep. 6, 2017

(65) Prior Publication Data

US 2017/0363182 A1    Dec. 21, 2017

Related U.S. Application Data

(63) Continuation of application No. 15/360,695, filed on Nov. 23, 2016, now Pat. No. 9,759,293, which is a
(Continued)

(51) Int. Cl.
  *F16H 7/12* (2006.01)
  *F16H 7/02* (2006.01)
  *F16H 7/08* (2006.01)

(52) U.S. Cl.
  CPC ............ *F16H 7/1281* (2013.01); *F16H 7/02* (2013.01); *F16H 2007/0806* (2013.01);
(Continued)

(58) Field of Classification Search
  CPC ........... F16H 2007/0874; F16H 7/1281; F16H 2007/081; F16H 2007/0806; F16H 2007/0846
(Continued)

(56) References Cited

U.S. PATENT DOCUMENTS 315,735 A * 4/1885 Colburn ...................... 474/134
976,115 A * 11/1910 Bard ............................ 474/134
(Continued)

FOREIGN PATENT DOCUMENTS

CA    2910627 A1    4/2016
CN    1802525 A     7/2006
(Continued)

OTHER PUBLICATIONS

Extended European Search Report for PCT/CA2016/050113 dated Sep. 11, 2018.
(Continued)

*Primary Examiner* — Henry Y Liu
(74) *Attorney, Agent, or Firm* — Millman IP Inc.

(57) ABSTRACT

In an aspect, a tensioner is provided for tensioning a belt and includes first and second tensioner arms having first and second pulleys respectively. The first and second pulleys are configured for engagement with first and second belt spans, and are biased in first and second free arm directions respectively. A second tensioner arm stop is positioned to limit the movement of the second tensioner arm in a direction opposite the second free arm direction. The second tensioner arm stop is positioned such that, in use, the second pulley is engaged with the endless drive member while the second tensioner arm is engaged with the second tensioner arm stop throughout a first selected range of operating conditions.

13 Claims, 6 Drawing Sheets

Related U.S. Application Data continuation-in-part of application No. PCT/CA2015/051067, filed on Oct. 21, 2015.

(60) Provisional application No. 62/373,804, filed on Aug. 11, 2016, provisional application No. 62/066,719, filed on Oct. 21, 2014, provisional application No. 62/113,302, filed on Feb. 6, 2015, provisional application No. 62/141,514, filed on Apr. 1, 2015, provisional application No. 62/145,993, filed on Apr. 10, 2015.

(52) U.S. Cl.
CPC ............ *F16H 2007/0842* (2013.01); *F16H 2007/0865* (2013.01); *F16H 2007/0893* (2013.01)

(58) Field of Classification Search
USPC .................................................... 474/134
See application file for complete search history.

(56) References Cited

U.S. PATENT DOCUMENTS

| | | | | |
|---|---|---|---|---|
| 1,805,326 A * | 5/1931 | Bunker | F16H 7/1281 | 474/132 |
| 1,848,423 A * | 3/1932 | Jackson | D01H 1/241 | 474/134 |
| 1,871,268 A * | 8/1932 | Hildebrand | F02D 1/00 | 474/134 |
| 2,066,721 A * | 1/1937 | Eaton | F16H 7/1281 | 474/109 |
| 2,425,476 A * | 8/1947 | Lade | D06F 53/04 | 211/119.09 |
| 2,639,623 A * | 5/1953 | Ausherman | F16H 7/1281 | 474/134 |
| 2,766,417 A * | 10/1956 | Merritt | H02K 23/66 | 318/475 |
| 2,875,842 A * | 3/1959 | Morrell | B62D 7/02 | 180/291 |
| 2,945,393 A * | 7/1960 | Paulson | F16H 7/1281 | 477/7 |
| 2,954,726 A * | 10/1960 | Kerridge | E01C 19/286 | 404/117 |
| 3,575,058 A * | 4/1971 | Kraus | F16H 7/1281 | 474/29 |
| RE27,861 E * | 1/1974 | Kraus | F16H 7/1281 | 474/29 |
| 4,511,348 A * | 4/1985 | Witdoek | F16H 7/12 | 474/109 |
| 4,564,098 A * | 1/1986 | Hormann | E05F 15/668 | 192/150 |
| 4,758,208 A * | 7/1988 | Bartos | F16H 7/1281 | 474/135 |
| 5,435,100 A * | 7/1995 | Kuisis | E06B 11/08 | 474/135 |
| 5,776,025 A * | 7/1998 | Labudde | F16H 7/1281 | 474/133 |
| 6,511,393 B1 * | 1/2003 | Bogl | F01L 1/024 | 474/101 |
| 6,609,989 B2 * | 8/2003 | Bogner | F02B 63/04 | 474/134 |
| 6,648,783 B1 * | 11/2003 | Bogner | F16H 7/1281 | 474/134 |
| 6,689,001 B2 * | 2/2004 | Oliver | F16H 7/1281 | 474/134 |
| 6,821,223 B2 * | 11/2004 | Henry | F01L 1/34 | 474/109 |
| 6,830,524 B2 * | 12/2004 | Tamai | F16H 7/1281 | 474/111 |
| 6,942,589 B2 * | 9/2005 | Rogers | F16H 7/12 | 474/134 |
| 6,960,145 B2 * | 11/2005 | Fraley, Jr. | B62D 5/0424 | 180/444 |
| 7,032,349 B2 * | 4/2006 | Oberheide | E05F 15/60 | 49/360 |
| 7,419,447 B2 * | 9/2008 | Serkh | F16H 7/1218 | 474/117 |
| 7,468,013 B2 * | 12/2008 | Di Giacomo | F16H 7/1281 | 474/134 |
| 7,494,434 B2 * | 2/2009 | McVicar | F16H 7/1281 | 474/101 |
| 7,648,436 B2 * | 1/2010 | Horst | F16H 19/06 | 474/117 |
| 7,699,731 B2 * | 4/2010 | Bicchi | F16H 35/008 | 318/8 |
| 7,892,125 B2 * | 2/2011 | Nelson | F16H 7/1254 | 474/101 |
| 7,901,310 B2 * | 3/2011 | Lolli | F16H 7/1281 | 474/134 |
| 8,353,795 B2 * | 1/2013 | Montani | F16H 7/1281 | 474/134 |
| 8,439,780 B2 * | 5/2013 | Ruffini | F16H 7/1281 | 474/112 |
| 8,591,358 B2 | 11/2013 | Fischer | | |
| 8,602,930 B2 | 12/2013 | Deneszczuk et al. | | |
| 8,821,328 B2 * | 9/2014 | Jud | F16H 7/1281 | 474/134 |
| 9,097,314 B2 | 8/2015 | Wolf et al. | | |
| 9,133,762 B2 | 9/2015 | Macguire et al. | | |
| 9,151,366 B2 | 10/2015 | Antchak et al. | | |
| 9,341,243 B2 | 5/2016 | Replete et al. | | |
| 9,528,576 B2 * | 12/2016 | Anstey | F16H 7/1281 | |
| 2002/0039943 A1 * | 4/2002 | Serkh | F16H 7/1218 | 474/134 |
| 2002/0086751 A1 * | 7/2002 | Bogner | F02B 63/04 | 474/134 |
| 2003/0109342 A1 * | 6/2003 | Oliver | F16H 7/1281 | 474/134 |
| 2003/0153421 A1 * | 8/2003 | Liu | F16H 7/1209 | 474/134 |
| 2003/0216203 A1 * | 11/2003 | Oliver | F16H 7/1281 | 474/134 |
| 2004/0043854 A1 * | 3/2004 | Fraley, Jr. | B62D 5/0424 | 474/134 |
| 2004/0072642 A1 * | 4/2004 | Serkh | F16H 7/1218 | 474/134 |
| 2004/0077446 A1 | 4/2004 | Manning | | |
| 2006/0100051 A1 * | 5/2006 | Di Giacomo | F16G 1/28 | 474/170 |
| 2006/0217222 A1 * | 9/2006 | Lolli | F16H 7/1281 | 474/134 |
| 2006/0287146 A1 * | 12/2006 | McVicar | F16H 7/1281 | 474/109 |
| 2007/0037648 A1 * | 2/2007 | Di Giacomo | F16H 7/1281 | 474/134 |
| 2007/0155559 A1 * | 7/2007 | Horst | F16H 19/06 | 474/134 |
| 2008/0214342 A1 * | 9/2008 | Montani | F16H 7/1281 | 474/134 |
| 2009/0069134 A1 * | 3/2009 | Kuo | A63B 21/154 | 474/134 |
| 2009/0298631 A1 | 12/2009 | Jud et al. | | |
| 2011/0070986 A1 * | 3/2011 | Maguire | F02B 67/06 | 474/135 |
| 2013/0040770 A1 * | 2/2013 | Wolf | F16H 7/1281 | 474/134 |
| 2013/0079185 A1 | 3/2013 | Schauerte et al. | | |
| 2013/0172137 A1 | 7/2013 | Antchak et al. | | |
| 2013/0260932 A1 | 10/2013 | Joern et al. | | |
| 2014/0256488 A1 | 9/2014 | Wolf et al. | | |
| 2014/0315673 A1 | 10/2014 | Zacker et al. | | |
| 2015/0051033 A1 * | 2/2015 | Replete | F16H 7/1218 | 474/117 |
| 2015/0060232 A1 | 3/2015 | Tran et al. | | |
| 2015/0167797 A1 * | 6/2015 | Noguchi | F16H 7/1281 | 477/3 |

(56) References Cited

U.S. PATENT DOCUMENTS

| | | | | |
|---|---|---|---|---|
| 2015/0345597 A1* | 12/2015 | Walter | ............... | F16H 7/0831 |
| | | | | 474/134 |
| 2015/0369347 A1* | 12/2015 | Wolf | ............... | F16H 7/1281 |
| | | | | 474/134 |
| 2017/0074375 A1* | 3/2017 | Ryeland | ............... | F16H 7/1281 |
| 2017/0306836 A1 | 10/2017 | Replete et al. | | |
| 2017/0363182 A1 | 12/2017 | Ryeland et al. | | |

FOREIGN PATENT DOCUMENTS

| | | | |
|---|---|---|---|
| CN | 102022495 | A | 4/2011 |
| CN | 102954167 | A | 3/2013 |
| CN | 104220780 | A | 12/2014 |
| DE | 19849659 | A1 | 5/2000 |
| DE | 102005039719 | A1 | 3/2007 |
| DE | 202008002279 | U1 | 4/2008 |
| DE | 102007042501 | A1 | 3/2009 |
| DE | 102013203957 | B3 | 2/2014 |
| DE | 102013206010 | B3 | 8/2014 |
| DE | 102013005884 | A1 | 10/2014 |
| DE | 102015205804 | A1 | 10/2015 |
| EP | 2128489 | B1 | 8/2011 |
| EP | 2557295 | A2 | 2/2013 |
| WO | 2001079727 | A2 | 10/2001 |
| WO | 2004059192 | A1 | 7/2004 |
| WO | 2004099650 | A1 | 11/2004 |
| WO | 2012061930 | A1 | 5/2012 |
| WO | 2013142951 | A1 | 10/2013 |
| WO | 2013159181 | A1 | 10/2013 |
| WO | 2014100894 | A1 | 7/2014 |
| WO | 2015027325 | A1 | 3/2015 |
| WO | 2015070329 | A1 | 5/2015 |
| WO | 2016061685 | A1 | 4/2016 |
| WO | 2016132054 | A1 | 8/2016 |

OTHER PUBLICATIONS

Office Action for CN201580057155 dated Dec. 3, 2018.
Office Action for CN201580057155 dated Dec. 3, 2018—English translation.
Extended European Search Report for PCT/CA2015/051067 dated Apr. 30, 2018.
Arc Spring Alternator Mounted Tensioner—Feb. 15, 2015.
Cellasto Components Complete Industrial Products (Brochure) dated Apr. 10, 2015, BASF (http://www.polyurethanes.basf.com/pu/Cellasto/).
Dynamics and Stability of Mechanical Systems with Follower Forces, Nov. 1971, George Hermann (Standford University, NASA).
EP2557295—English translation.
International Search Report and Written Opinion for PCT/CA2017050660 dated Sep. 15, 2017.
International Search Report and Written Opinion for PCT/CA2017050954 dated Nov. 9, 2017.
ISR and WO for PCT/CA2016/050113 dated Aug. 17, 2017.
ISR and WO for PCT/CA2015/051067 dated Feb. 3, 2016.
Office Action for CN201680008671 dated Jan. 24, 2019.
Office Action for CN201680008671 dated Jan. 24, 2019—English translation.
EP Search Report for EP Application No. 17805447.4 dated Nov. 4, 2019.
Office Action for U.S. Appl. No. 15/545,808 dated Feb. 24, 2020.
EESR for EP17838270.1 mailed Jun. 19, 2020.

* cited by examiner

ENDLESS DRIVE ARRANGEMENT AND IMPROVED TWO-ARMED TENSIONING SYSTEM FOR SAME

CROSS-REFERENCE TO RELATED APPLICATIONS

This application is a continuation of and claims the benefit of U.S. Ser. No. 15/360,695 filed on Nov. 23, 2016, which claims the benefit of U.S. Provisional Patent application 62/373,804 filed Aug. 11, 2016, and PCT application PCT/CA2015/051067 filed Oct. 21, 2015, which in turn claims the benefit of U.S. Provisional Patent Application No. 62/066,719 filed Oct. 21, 2014, U.S. Provisional Patent Application No. 62/113,302 filed Feb. 6, 2015, U.S. Provisional Patent Application No. 62/141,514 filed Apr. 1, 2015, and U.S. Provisional Patent Application No. 62/145,993 filed Apr. 10, 2015, the contents of all of which are incorporated herein in their entirety.

FIELD OF THE DISCLOSURE

This disclosure relates generally to the art of endless drive arrangements and more particularly to systems for vehicular front engine accessory drive arrangements that employ a motor/generator unit or other secondary motive unit in addition to an engine and a two-armed tensioner.

BACKGROUND

Vehicular engines typically employ a front engine accessory drive to transfer power to one or more accessories, such as an alternator, an air conditioner compressor, a water pump and various other accessories. Some vehicles are hybrids and employ both an internal combustion engine, along with an electric drive. There are many possible configurations of such vehicles. For example, in some configurations, the electric motor is used to assist the engine in driving the vehicle (i.e. the electric motor is used to temporarily boost the amount of power being sent to the driven wheels of the vehicle). In some configurations, the electric motor is used to drive the driven wheels of the vehicle by itself and only after the battery is exhausted to a sufficient level does the engine turn on to take over the function of driving the vehicle.

While hybrid vehicles are advantageous in terms of improved fuel economy, their operation can result in higher stresses and different stresses on certain components such as the belt from the front engine accessory drive, which can lead to a reduction in the operating life of these components. It would be advantageous to provide improved operating life for components of the front engine accessory drive in a hybrid vehicle.

SUMMARY

In an aspect, a tensioner is provided for tensioning an endless drive arrangement on an engine, which includes a crankshaft pulley driven by a crankshaft, a motor/generator unit (MGU) pulley, and an endless drive member entrained about the crankshaft pulley and the MGU pulley, wherein the endless drive arrangement is operable in a first mode in which the crankshaft pulley drives the endless drive member and the MGU pulley does not drive the endless drive member such that tension in a first span of the endless drive member is lower than a second span of the endless drive member, and wherein the endless drive member is operable in a second mode in which the MGU pulley drives the endless drive member in isolation or in conjunction with the crankshaft pulley. The tensioner includes a first tensioner arm that has a first tensioner pulley rotatably mounted thereto for rotation about a first tensioner pulley axis. The first tensioner pulley is configured for engagement with the first span of the endless drive member. The tensioner further includes a second tensioner arm that has a second tensioner pulley rotatably mounted thereto for rotation about a second tensioner pulley axis. The second tensioner pulley is configured for engagement with the second span of the endless drive member. The tensioner further includes a tensioner biasing member that is positioned to bias the first and second tensioner arms in a first free arm direction and in a second free arm direction, respectively. The tensioner further includes a second tensioner arm stop surface that is positioned to limit the movement of the second tensioner arm in a direction opposite the second free arm direction. Under static equilibrium, the second tensioner arm has a preload torque from at least the endless drive member and the tensioner biasing member, which urges the second tensioner arm into engagement with the second tensioner arm stop surface of between about 1 Nm and about 15 Nm. In use, the second tensioner arm is engaged with the second tensioner arm stop surface in the first mode of operation and in the second mode of operation unless a transient torque acting opposite the preload torque exceeds the magnitude of the preload torque by a sufficient amount.

In another aspect, an endless drive arrangement for an engine is provided and includes a crankshaft pulley connected to a crankshaft, a secondary drive device pulley connected to a shaft of a secondary drive device, an endless drive member that is engaged with the crankshaft pulley and with the secondary drive device pulley, and a tensioner. The tensioner includes a first tensioner arm, a second tensioner arm and a tensioner biasing member. The first tensioner arm has a first tensioner pulley rotatably mounted thereto. The first tensioner pulley is engaged with the first span of the endless drive member on a first side of the secondary drive device. In use, the first tensioner arm moves to and fro. The second tensioner arm has a second tensioner pulley rotatably mounted thereto. The second tensioner pulley is engaged with the second span of the endless drive member on a second side of the secondary drive device. In use, the second tensioner arm moves to and fro. The tensioner biasing member is positioned to bias the first and second tensioner arms in respective first and second free arm directions. The tensioner further includes a second tensioner arm stop surface that is positioned to limit the movement of the second tensioner arm in a direction opposite the second free arm direction. The second tensioner arm has a preload torque in static equilibrium from a combination of torques applied by at least the endless drive member and the tensioner biasing member, wherein the preload torque urges the second tensioner arm into engagement with the second tensioner arm stop surface such that, in use, the second tensioner arm is engaged with the second tensioner arm stop surface in operational modes wherein the crankshaft pulley exclusively drives the endless drive member or wherein the secondary drive device drives the endless drive member, unless a transient torque acting opposite the preload torque exceeds the magnitude of the preload torque by a sufficient amount.

Another aspect relates to a method of operating an endless drive arrangement for an engine having a crankshaft-driven pulley; a motor/generator unit (MGU) pulley; an endless drive member interconnecting the crankshaft pulley and the MGU pulley; and a tensioner which includes first and second tensioner arms, a tensioner biasing member, and a second tensioner arm stop surface. The first tensioner arm has a first tensioner pulley rotatably mounted thereto for engagement with a first span of the endless drive member and the second tensioner arm has a second tensioner pulley rotatably mounted thereto for engagement with a second span of the endless drive member. The tensioner biasing member biases the first and second tensioner arms in a first free arm direction and in a second free arm direction, respectively. The second tensioner arm stop surface is positioned to limit the movement of the second tensioner arm in a direction opposite the second free arm direction. The method of operating the endless drive arrangement includes operating the endless drive arrangement in a first mode in which the crankshaft pulley drives the endless drive member and the MGU pulley does not drive the endless drive member such that tension in the first span of the endless drive member is lower than the second span of the endless drive member; operating the endless drive member in a second mode in which the MGU pulley drives the endless drive member in isolation or in conjunction with the crankshaft pulley; and generating a pre-load torque under static equilibrium to urge the second tensioner arm into engagement with the second tensioner arm stop surface. In the event transient torque on the second tensioner arm acts against the preload torque but is below the preload torque, the second tensioner arm is kept engaged with the second tensioner arm stop surface and the first tensioner arm is spaced apart from the first tensioner arm stop surface whether or not the endless drive arrangement operates in the first or second mode.

BRIEF DESCRIPTION OF THE DRAWINGS

The foregoing and other aspects of the invention will be better appreciated with reference to the attached drawings, wherein.

DETAILED DESCRIPTION OF EXAMPLE EMBODIMENTS

Figure 1:
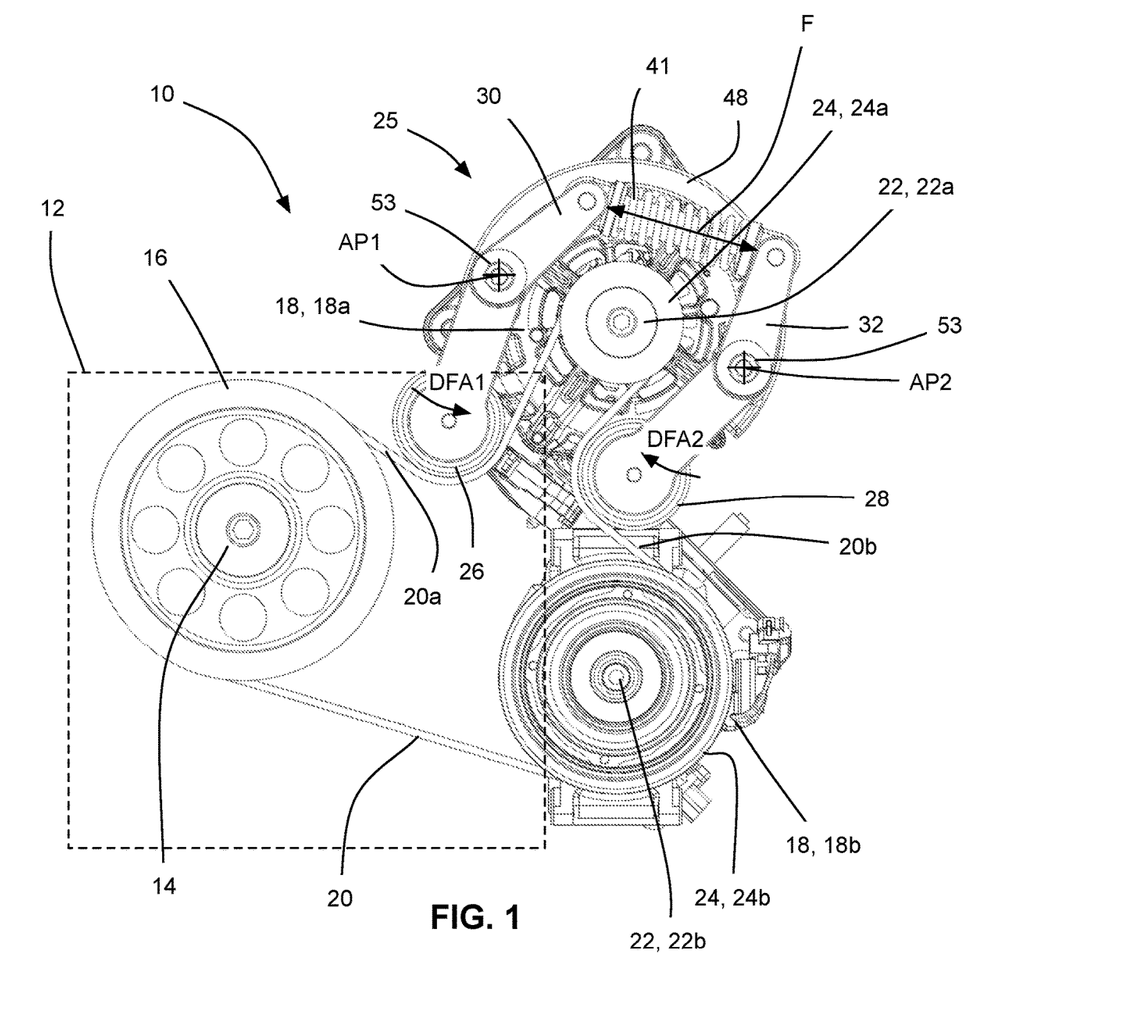
FIG. 1 is a plan view of an endless drive arrangement including a tensioner, in accordance with an embodiment of the present disclosure.

FIG. 1 shows an endless drive arrangement 10 for an engine, schematically represented by a dashed-line rectangle and shown at 12. In embodiments wherein the engine 12 is mounted in a vehicle, the endless drive arrangement 10 may be a front engine accessory drive. The engine 12 includes a crankshaft 14 that has a crankshaft pulley 16 mounted thereon. The crankshaft pulley 16 is drivable by the crankshaft 14 of the engine 12 and itself drives one or more vehicle accessories 18 via an endless drive member 20, such as a belt. For convenience the endless drive member 20 will be referred to as a belt 20, however it will be understood that it could be any other type of endless drive member. The accessories 18 may include a motor-generator unit (MGU) 18a, an air conditioning compressor 18b, a water pump (not shown), a power steering pump (not shown) and/or any other suitable accessory.

In FIG. 1, two accessories 18 are shown, however there could be more or fewer accessories. Each of the driven accessories has a drive shaft 22 and a pulley 24. The MGU 18a has an MGU drive shaft 22a and an MGU pulley 24a.

As can be seen in FIG. 1, the belt 20 is engaged with the crankshaft pulley 16 and the MGU pulley shown at 24a (and the other accessory pulleys 24). Under normal operating conditions the endless drive arrangement 10 is operable in a first mode in which the endless drive arrangement 10 may be driven by the engine 12, and in turn drives the pulleys 24 of the accessories 18. In the first mode, the tension in the first belt span 20a is lower than the tension in the second belt span 20b. The MGU 18a may be operable to as an alternator in the first mode, in order to charge the vehicle's battery (not shown).

The MGU 18a is also operable as a motor, wherein it drives the MGU pulley 24a, which in turn drives the belt 20. During such events where the MGU 18a is operated as a motor, the endless drive arrangement 10 may be considered to be operable in a second mode, in which the tension in the second belt span 20b is lower than the tension in the first belt span 20a. This may be during a 'boost' event when the engine is driving the wheels of the vehicle, but additional power is desired to supply further power to the wheels indirectly by transferring power to the engine's crankshaft 14 via the belt 20. Another situation in which the MGU 18a is operated as a motor include a BAS (Belt-Alternator Start) event, in which the MGU 18a drives the belt 20 in order to cause rotation of the crankshaft 14, and thereby start the engine 12. Yet another situation in which the MGU 18a is operated as a motor is an ISAF (Idle/Stop Accessory Function) event, when the MGU 18a is used to drive the belt 20 in order to drive one or more accessories when the engine is off (e.g. in some hybrid vehicles where the engine is turned off automatically when the vehicle is at a stoplight or is otherwise stopped briefly).

In the present disclosure, the span 20a of the belt 20 may be referred to at the belt span 20a, and the span 20b of the belt 20 may be referred to as the belt span 20b.

It will be noted that the MGU 18a is but one example of a secondary drive device that can be used as a motor to drive the belt 20 for any of the purposes ascribed above to the MGU 18a. In an alternative example, the accessory 18a may be a typical alternator and a separate electric motor may be provided adjacent to the alternator (either upstream or downstream on the belt 20 from the alternator) to driving the belt 20 when it is desired to boost acceleration of the vehicle, in BAS operation, and/or in ISAF operation.

Figure 4:
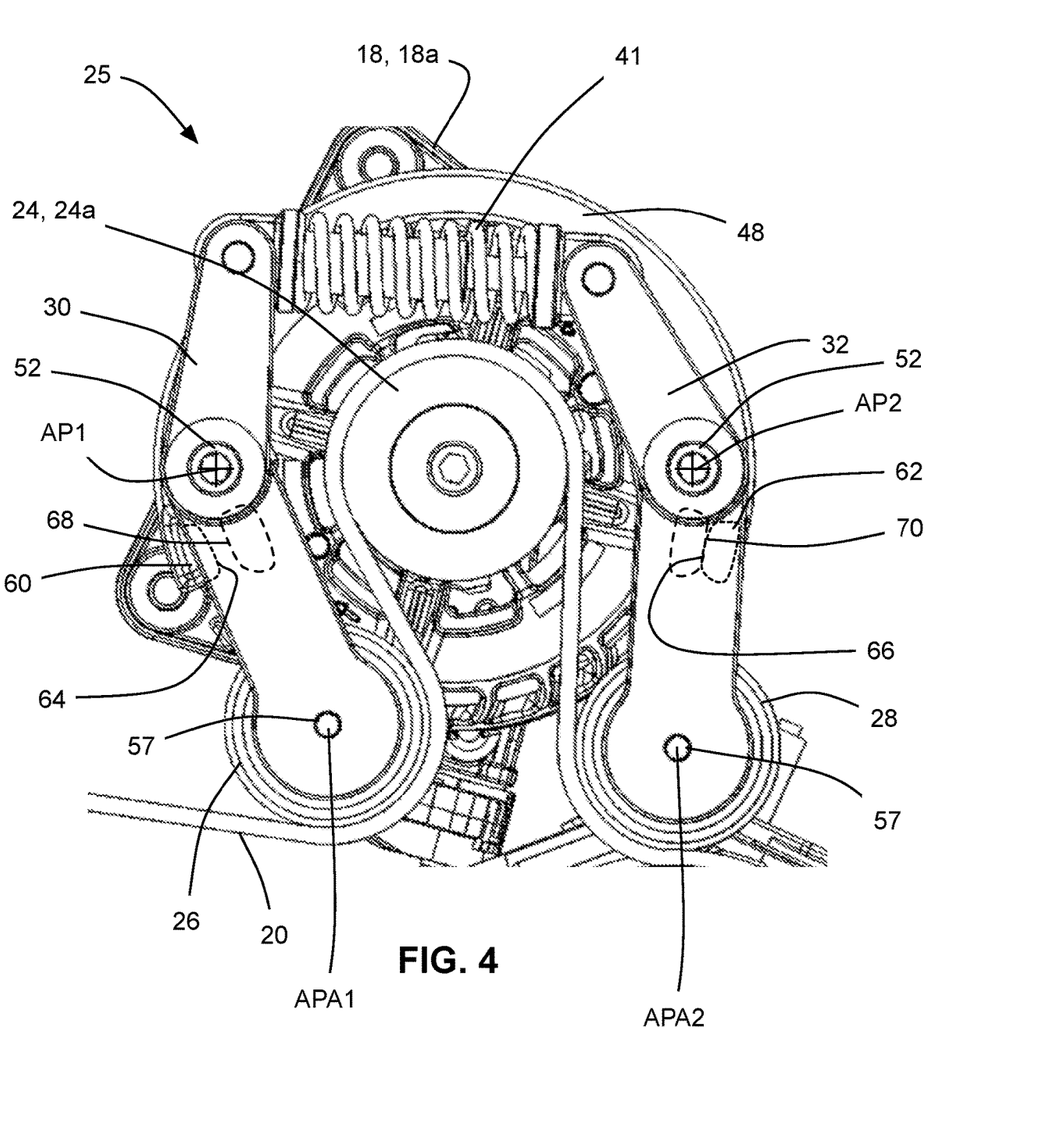
FIG. 4 is a plan view of the endless drive arrangement shown in FIG. 1, operating in a first mode.

A tensioner 25 for the endless drive arrangement 10 is shown in FIG. 1. A first tensioner pulley 26 is rotatably mounted on a first tensioner arm 30 for rotational movement of the pulley about a first arm pulley axis APA1 (FIG. 4). A second tensioner pulley 28 is rotatably mounted on a second tensioner arm 32 for rotational movement of the pulley about a second arm pulley axis APA2. The first and second tensioner pulleys 26, 28 are rotatably mounted to the first and second tensioner arms 30, 32, respectively, via shoulder bolts 57 (FIG. 4).

The first and second tensioner arms 30 and 32 are pivotally mounted to a base 48 for pivotal movement about first and second tensioner arm pivot axes AP1 and AP2, respectively. The pivotal mounting to the base 48 may be provided by a shoulder bolt 52 that passes through an aperture in each of the tensioner arms 30 and 32 and into a threaded aperture in the base 48.

The base 48 mounts fixedly to the housing of the MGU 18a or any other suitable stationary member.

The first and second tensioner pulleys 26 and 28 are biased in first and second free arm directions (shown in FIG. 1 at DFA1 and DFA2 respectively). More specifically, a tensioner biasing member 41 may be positioned to apply a tensioner biasing force F on the first and second tensioner arms 30 and 32 in the respective first and second free arm directions DFA1 and DFA2.

The tensioner biasing member 41 may have any suitable structure, such as, for example, a linear helical compression spring that extends between the first and second tensioner arms 30 and 32. In an alternative embodiment, shown in FIG. 2, the tensioner biasing member 41 may, for example, be a torsion spring that abuts first and second drive surfaces 43 and 45 on the first and second arms 30 and 32 and urges the arms 30 and 32 in directions to drive the first and second tensioner pulleys 26 (shown partially in FIG. 2) and 28 (not shown in FIG. 2) into the belt 20.

Figure 2:
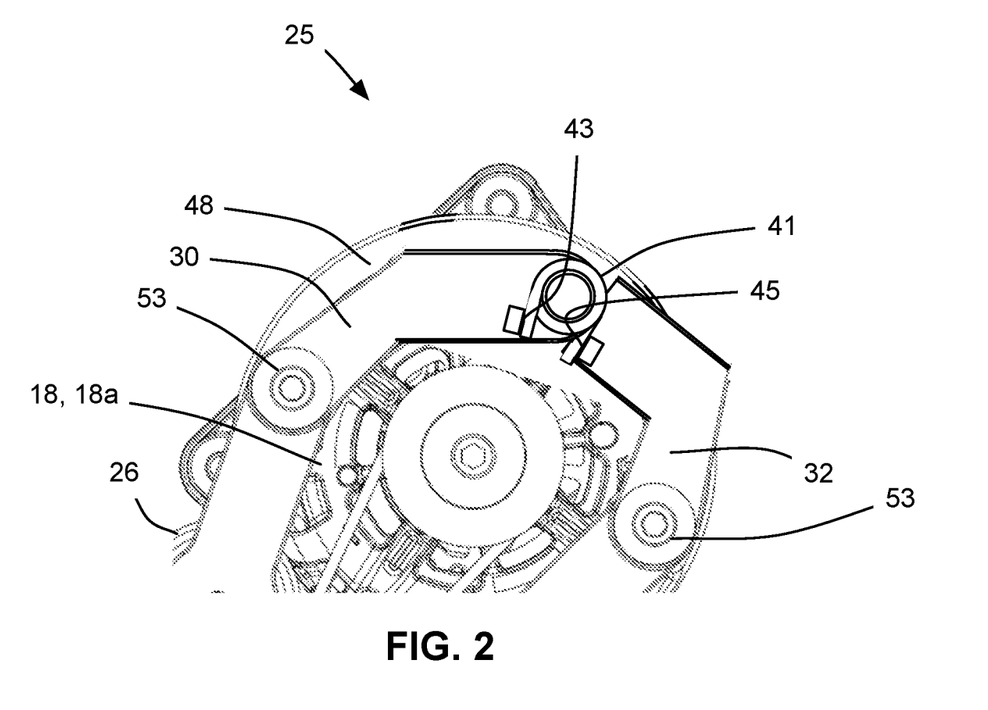
FIG. 2 is a plan view of a variation of the endless drive arrangement shown in FIG. 1.

In the embodiments shown in FIGS. 1 and 2, the first tensioner pulley 26 is on a first side of the first tensioner arm pivot axis AP1, in the sense that the tensioner pulley 26 is positioned to, in use, apply a moment in a first rotational direction on the first tensioner arm 30 about the pivot axis AP1. The tensioner biasing member 41 is positioned to apply the tensioner biasing force F on a second side of the first tensioner arm pivot axis AP1, in the sense that the tensioner biasing member 41 is positioned to, in use, apply a moment in a second rotational direction (that is opposite the first rotational direction) on the first tensioner arm 30 about the pivot axis AP1.

Analogously, the second tensioner pulley 28 is positioned on a first side of the second tensioner arm pivot axis AP2, in the sense that, in use, as a result of its engagement with the belt span 20b, the tensioner pulley 28 applies a moment in a first rotational direction on the second tensioner arm 32 about the pivot axis AP2, and the tensioner biasing member 41 is positioned to apply the tensioner biasing force F on a second side of the second tensioner arm pivot axis AP2, in the sense that, in use, the tensioner biasing member 41 applies a moment in a second rotational direction (that is opposite this immediately aforementioned first rotational direction) on the second tensioner arm 32 about the pivot axis AP2.

Several features of the tensioner 25 may be advantageous and are described further below.

Figure 3:
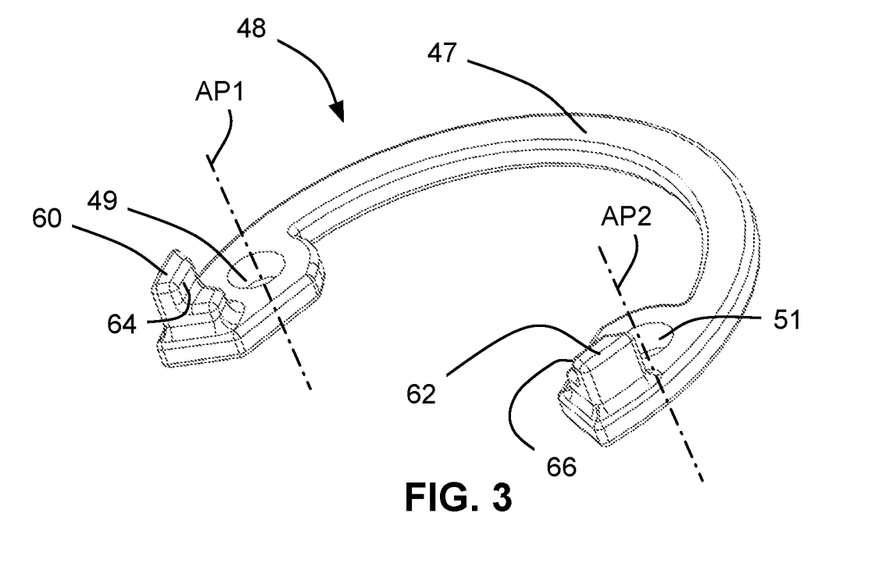
FIG. 3 is a perspective view of an element of the endless drive arrangement shown in FIG. 1.

In an embodiment, the base 48 for the tensioner 25 may be generally C-shaped as shown in FIG. 3. In the embodiment shown in FIG. 3, the base 48 has a base body 47, and first and second mounting apertures 49 and 51 proximate the circumferential ends of the base body 47, wherein the first and second apertures 49 and 51 are configured for mounting the base 28 to the housing of the MGU 18a or another suitable member. The mounting apertures 49 and 51 may also be used to receive pins (shown at 53 in FIGS. 1 and 2) for supporting the pivoting movement of the first and second tensioner arms 30 and 32 and may thus define the first and second pivot axes AP1 and AP2. Furthermore, the opening that is defined by the C-shape of the base 48, is free of any obstructions in an axial direction. As a result, the tensioner 25 is configured to facilitate dissipation of heat from the MGU 18a.

In the embodiment shown in FIG. 4, the tensioner 25 includes a first tensioner arm stop 60 that is positioned to limit the movement of the first tensioner arm 30 in a direction opposite the first free arm direction. The direction opposite the first free arm direction may be referred to as a first load stop direction. The tensioner 25 includes a second tensioner arm stop 62 that is positioned to limit the movement of the second tensioner arm 32 in a direction opposite the second free arm direction (i.e. a second load stop direction). The tensioner arm stops 60 and 62 have first and second base-mounted stop surfaces 64 and 66 respectively that are engageable with first and second arm-mounted stop surfaces 68 and 70 on the first and second tensioner arms 30 and 32 respectively.

The tensioner 25 is configured such that, in use, the second tensioner arm 32 is engaged with the second tensioner arm stop 62 throughout a first selected range of operating conditions.

Optionally, the tensioner 25 is configured such that, in use, the first tensioner arm 30 is engaged with the first tensioner arm stop 60 throughout a second selected range of operating conditions that is different from the first range of operating conditions.

As a further option, the tensioner 25 is configured such that, in use, the first and second tensioner arms 30 and 32 are disengaged from the first and second tensioner arm stops 60 and 62 throughout a third selected range of operating conditions that is different from the first and second ranges of operating conditions.

Figure 5A:
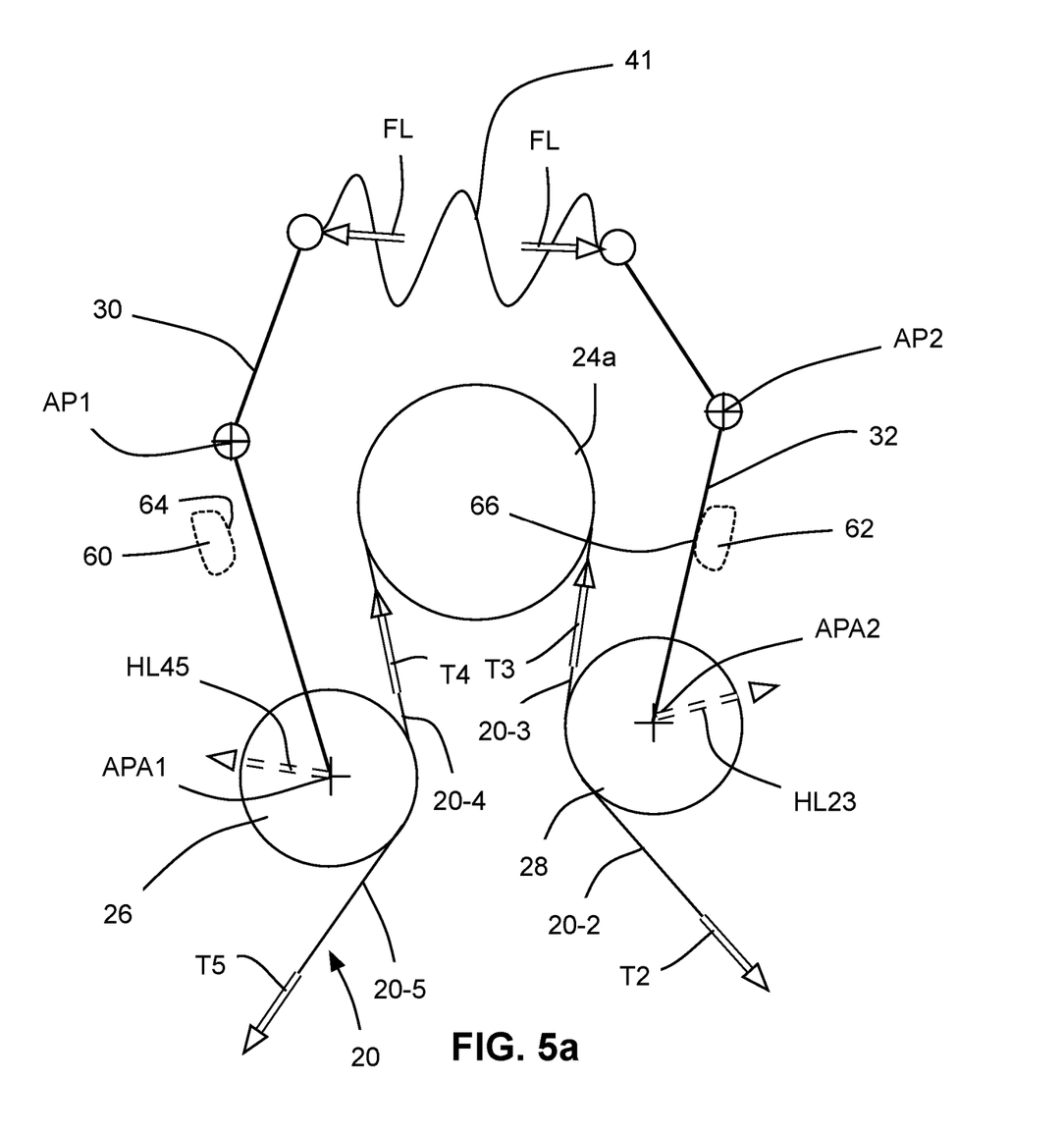
FIG. 5a is a schematic representation of the endless drive arrangement shown in FIG. 1, operating in the first mode, illustrating forces exerted on tensioner arms that are part of the tensioner.
Figure 5B:
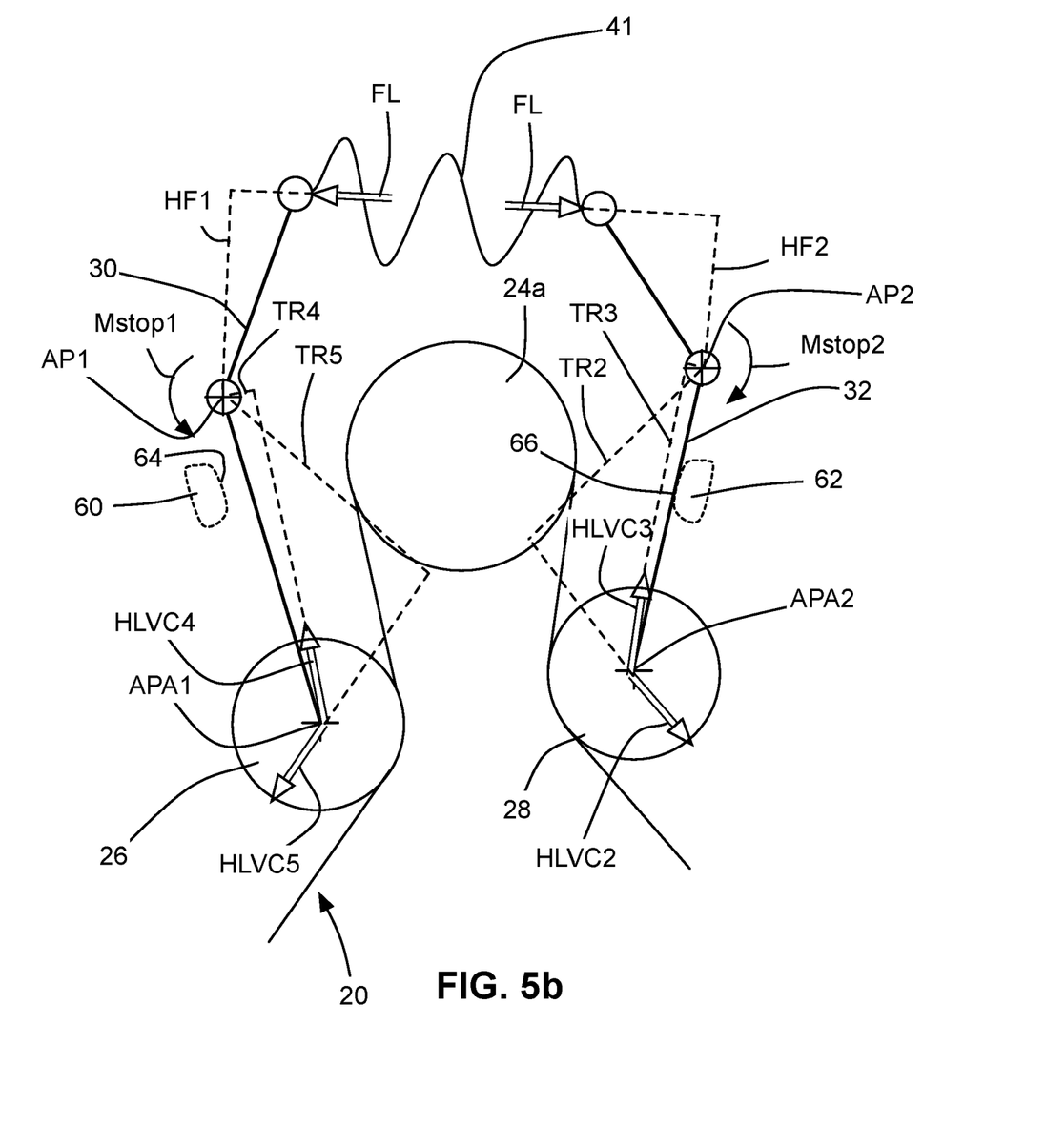
FIG. 5b is a schematic representation of the endless drive arrangement shown in FIG. 1, operating in the first mode, further illustrating forces and moment arms in relation to the tensioner arms.
Figure 5C:
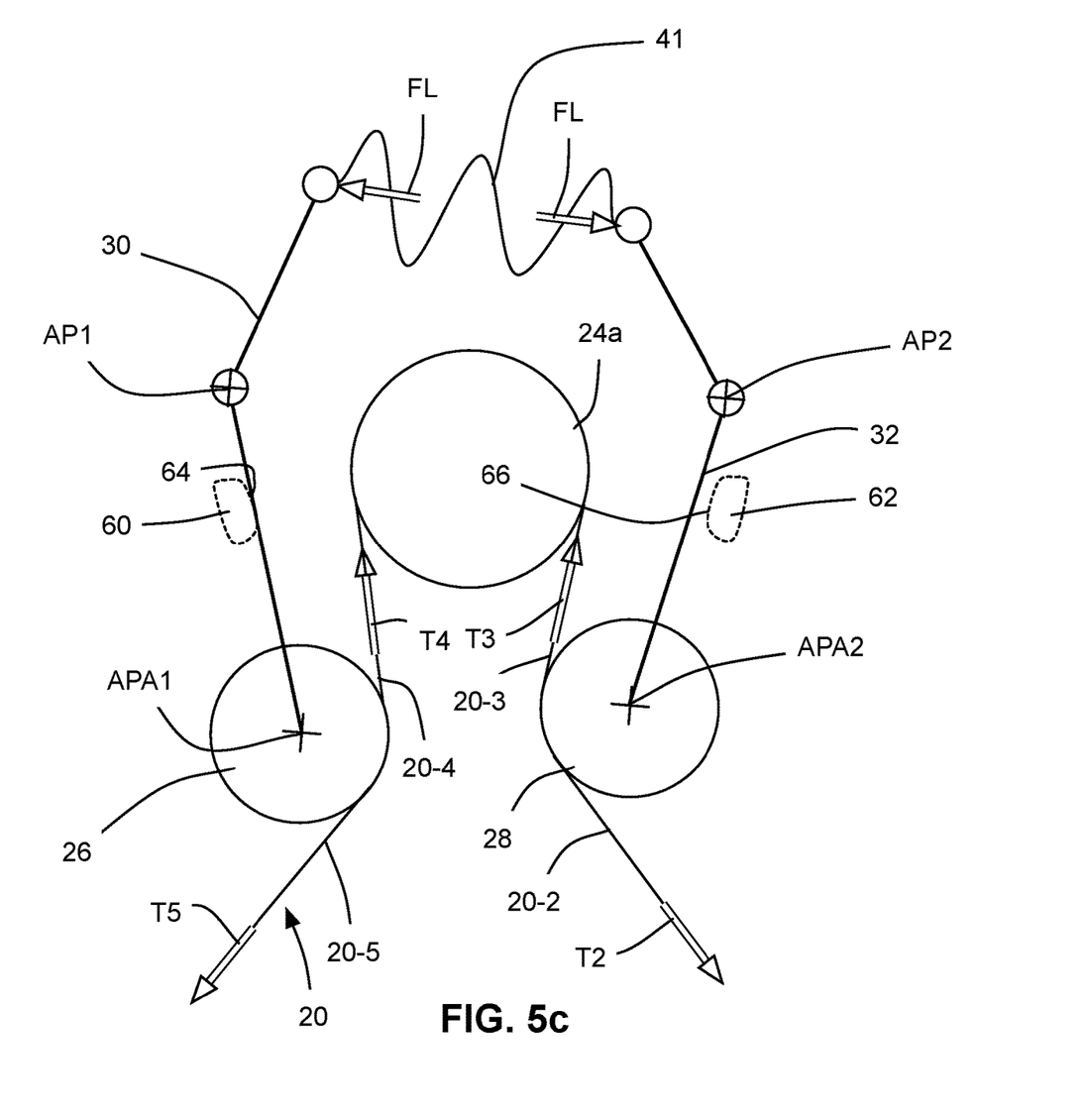
FIG. 5c is a schematic representation of the endless drive arrangement shown in FIG. 1, operating in a second mode, illustrating forces exerted on the tensioner arms.

Reference is made to FIGS. 5a-5c, in which there is a schematic representation of the tensioner 25 to show the forces and moments acting thereon. In FIGS. 5a-5c, the tensioner arms 30 and 32, the belt 20 and the biasing member 41 are represented as single lines and the pulleys 24a, 26 and 28 are shown in outline only, to avoid visual clutter in these figures.

The forces that act on the tensioner 25 will create moments that urge the tensioner arms 30 and 32 to swing one way or the other include the forces applied to the tensioner arms 30 and 32 by the belt 20 and these forces applied to the tensioner arms 30 and 32 by the biasing member 41. These forces are shown in FIG. 5a. The belt tension in a belt span 20-2 is shown as T2; the belt tension in a belt span 20-3 is shown as T3; the belt tension in a belt span 20-4 is shown as T4; and the belt tension in a belt span 20-5 is shown as T5. The force of the biasing member 41 is shown as FL. As can be seen the biasing member 41 applies the force FL at one end on the first tensioner arm 30 and at the other end on the second tensioner arm 32. Under static equilibrium, the belt tension is considered to be substantially equal everywhere (i.e., throughout all of the spans 20-2, 20-3, 20-4 and 20-5). Thus, for the purposes of the present mathematical derivation, T2=T3=T4=T5. These tensions result in hub loads shown at HL23 and HL45 on the first and second tensioner arms 32 and 30 respectively. The hub loads HL23 and HL45 act on the tensioner arms 32 and 30 at the centers of rotation of the pulleys 28 and 26 respectively (i.e. axes APA2 and APA1). The directions of the hub loads is dependent on the respective wrap angles of the belt 20 on the pulleys 26 and 28, as will be understood by those skilled in the art.

The hub load HL23 can be divided into a vector component HLVC2 which is parallel to the belt span 20-2 and a vector component HLVC3 which is parallel to the belt span 20-3. The magnitudes of HLVC2 and HLVC3 are the same as the tension forces T2 and T3, but act on the arm 32, whereas the tension forces T2 and T3 act on the pulley 28. Similarly, the hub load HL45 can be divided into a vector component HLVC4 which is parallel to the belt span 20-4 and a vector component HLVC5 which is parallel to the belt span 20-5. The magnitudes of HLVC4 and HLVC5 are the same as the tension forces T4 and T5, but act on the arm 30, whereas the tension forces T4 and T5 act on the pulley 26.

Put another way, the belt tension forces T2 and T3, which act on the surface of the pulley 28, which is itself rotatable about the axis APA2, are transferred to the tensioner arm 32 at the center of rotation of the pulley 28 (i.e., along axis APA2), resulting in forces HLVC2 and HLVC3.

FIG. 5b illustrates the moment arms that are associated with each of the hub load component forces, HLVC2, HLVC3, HLVC4 and HLVC5 (i.e., the perpendicular distances of the lines of action of each of the forces and the pivot axes AP1 and AP2). The moment arms associated with the forces T2 and T3 relative to the pivot axis AP2 are shown at TR2 and TR3, respectively. Similarly, the forces T4 and T5 are shown in FIG. 5b acting through the axis APA1 of the pulley 26 and the moment arms associated with the forces T4 and T5 relative to the pivot axis AP1 are shown at TR4 and TR5, respectively. Additionally, the moment arms of the forces HL acting on each tensioner arm 30 and 32 are shown as HF1 and HF2, respectively.

In general, when the tensioner 25 is in static equilibrium, the stop 62 applies a force and therefore a moment to compensate for the moments applied by the belt 20 and the biasing member 41 so that the net moment on the tensioner arm 32 is zero. The moment applied by the stop 62 is represented as Mstop2. Similarly, the stop 60 applies a force and therefore a moment to compensate for the moments applied by the belt 20 and the biasing member 41 so that the net moment on the tensioner arm 30 is zero. The moment applied by the stop 60 is represented as Mstop1. It will be understood that, in any equilibrium position in which the first arm 30 is not in contact with the first stop 60, then the moment Mstop1 is zero, and similarly, in any equilibrium position in which the second arm 32 is not in contact with the second stop 62, then the moment Mstop2 is zero. The mathematical expressions relating to a static equilibrium condition are:

$HLVC4 \cdot TR4 - HLVC5 \cdot TR5 + FL \cdot HF1 + Mstop1 = 0$ $HLVC2 \cdot TR2 - HLVC3 \cdot TR3 - FL \cdot HF2 - Mstop2 = 0$ Because HLVC2=T2, HLVC3=T3, HLVC4=T4, and HLVC5=T5, we can express these two aforementioned equations as:

$T4 \cdot TR4 - T5 \cdot TR5 + FL \cdot HF1 + Mstop1 = 0$ $T2 \cdot TR2 - T3 \cdot TR3 - FL \cdot HF2 - Mstop2 = 0$ In these two aforementioned mathematical expressions, moments in the counterclockwise direction were considered to be positive and moments in the clockwise direction were considered to be negative. Because the tension values are all equal to one another, T2, T3, T4 and T5 may all be represented by a single term, T0. When the tensioner 25 is in a static equilibrium condition as shown in FIGS. 5a and 5b, the moment applied by the first stop 60 is zero, since, as noted above, it is not in contact with the first tensioner arm 30. Thus, Mstop1=0 in such situations.

Thus, in such situations, the equations above may be rewritten as follows:

$T0 \cdot TR4 - T0 \cdot TR5 + FL \cdot HF1 = 0$ $T0 \cdot TR2 - T0 \cdot TR3 - FL \cdot HF2 - Mstop2 = 0$ By solving the first equation above for FL and inserting this expression into the second equation, the result is:

$$T0 \cdot TR2 - T0 \cdot TR3 - \frac{(T0 \cdot TR5 - T0 \cdot TR4) \cdot HF2}{HF1} - Mstop2 = 0$$

Thus:

$$T0 \left( TR2 - TR3 - \frac{HF1}{HF2} \cdot (TR5 - TR4) \right) = Mstop2$$

It will be understood that T0 is always positive since a negative value for T0 would indicate that the belt 20 has less than zero tension. Furthermore, it will be understood that Mstop2 is positive in the context of the above equation at least for the equilibrium position shown in FIGS. 5a and 5b, since it is desired for the stop 62 to apply a moment in the selected direction on the tensioner arm 32. Since Mstop2 and T0 must both be positive, it can readily be seen that the expression:

$$TR2 - TR3 - \frac{HF1}{HF2} \cdot (TR5 - TR4) \text{ must be positive.}$$

If a value TR is used to represent TR2−TR3, and TL is used to represent TR5−TR4, then the expression above can be rewritten as:

$$TR - \frac{HF1}{HF2} \cdot TL > 0$$

If the value of TL is greater than zero, then the expression can be rewritten as:

$$\frac{TR}{TL} > \frac{HF2}{HF1}$$

To determine if the value of TL is greater than zero, one can review the equation shown above:

$T0 \cdot TR4 - T0 \cdot TR5 + FL \cdot HF1 = 0$

This can be rewritten as:

$T0(TR5 - TR4) = FL \cdot HF1$, and therefore:

$T0 \cdot TL = FL \cdot HF1$

Since the moment applied by the biasing member 41 is positive, and, as noted above, the tension T0 is positive, then the value of TL must be positive, for the situation shown in FIGS. 5a and 5b.

As a result, the expression shown above is applicable, namely that:

$$\frac{TR}{TL} > \frac{HF2}{HF1}$$

By meeting the above noted relationship, the tensioner 25 remains stable against the second base-mounted stop surface 66 when the endless drive arrangement is in static equilibrium. It will be noted that static equilibrium is reached when the engine is off. In other words, it is desirable for the second tensioner arm 32 to abut the second arm stop 62 when the engine is off, in at least some embodiments.

Meeting the aforementioned relationship entails some preload torque urging the second tensioner arm 32 against the second base-mounted stop surface 66. This preload torque can be selected to cause the second tensioner arm 32 to remain against the stop surface 66 during certain operating conditions (referred to above as the first set of operating conditions) which are described further below. It is valuable to set the preload torque in the tensioner 25 to be sufficiently high that certain transient events that occur during operation do not cause movement of the tensioner arm 32 away from the stop 62. As noted above, such movement has a number of deleterious consequences including, but not limited to, contributing to NVH (noise, vibration and harshness), energy wastage (such as the energy associated with causing the movement of the tensioner arms and the rapid changes in direction of travel of the tensioner arms that are associated with torsional vibrations), and reduction in the operating life of the tensioner due to component wear and dynamic stresses associated with the accelerations and decelerations on the components of the tensioner during such movement.

Another advantage to maintaining the second arm 32 against the stop surface 66 is that any damping structures that are provided on the tensioner 25 in association with the second arm 32 incur a reduced amount of wear. Additionally, the stop surface 66 on the base (and the corresponding surface 70 on the second arm 32) incur a reduced amount of wear as compared to a situation where there is repeated impact with a stop surface.

However, it is desirable for the preload torque to not be so high that the tensioner arm 32 always remains engaged with the stop 62 under all operating conditions. If the preload torque was so high as to always maintain engagement between the tensioner arm 32 and the stop 62, then the resulting tension in the belt 20 would be so high that a significant amount of parasitic loss would be incurred, resulting in a reduction in available power for the engine and a reduction in fuel efficiency. Therefore, it is desirable for the preload torque to be high enough that under certain operating conditions the preload torque is sufficient to maintain engagement of the tensioner arm 32 with the stop 62, and to permit the second tensioner arm 32 to leave the stop 62 under certain other operation conditions. For example, with a preload torque of between about 1 Nm and about 15 Nm of torque on the second tensioner arm 32, movement of the tensioner arm 32 away from the stop 62 is prevented during the majority of events that would cause movement of a tensioner that does not incorporate such preload. Such events are a by-product of the operation of an engine and the commonly available accessories available in a modern hybrid vehicle, such as the air conditioning compressor, or the water pump, while adding relatively little to the tension in the belt 20 and therefore adding relatively little to the parasitic losses that are associated with high belt tension. These are elements that are part of the vehicle, but do not contribute directly to the generation of motive power for the vehicle, in contrast to elements such as the MGU 18a. It has been determined that the aforementioned range of preloads (about 1 Nm to about 15 Nm) on the second tensioner arm 32 is particularly desirable in terms of improving operating life of the components, reducing parasitic losses that are associated with high belt tension, while also reducing energy losses that result from the energy expended in moving tensioner arms during operation of the engine.

It may be desirable, in embodiments in which the first arm stop 60 is provided, for the tensioner 25 to move to the position shown in FIG. 5c, wherein the first tensioner arm 30 abuts the first arm stop 60, under certain conditions, such as certain conditions when the engine operates in the second mode.

Some of the events that cause a set of conditions that can generate a torque that urges the tensioner arm 32 in a direction away from stop 62 will now be described. As will be seen, some of the events cause a torque that is low enough that the second tensioner arm 32 does not come off of its stop 62. Some of the events may cause a torque high enough to bring the second tensioner arm 32 off of its stop 62.

One event is the activation of the air conditioning clutch to initiate operation of the compressor 18b (FIG. 1). Inertia in the rotor of the air conditioning compressor 18b and a resistance to movement due to the compression of any refrigerant gas that is in the compressor 18b at that time can cause a transient event which results in a momentary reduction in the belt tension in the belt spans 20-2 and 20-3 momentarily. In some embodiments, the tensioner arm 32 will be preloaded sufficiently to ensure that it remains against the stop 62 during this transient event. However, in some embodiments, it is possible to set the preload on the arm 32 such that the arm 32 would momentarily come off the stop 62 during an air conditioning engagement event.

Another event is the disengagement of the air conditioning compressor 18b, the belt tension on the spans engaging the tensioner arm 32 will increase, thereby increasing the amount of torque urging the arm 32 into the stop 62. Thus, the tensioner arm 32 will not lift off the stop 62 during such an event.

During a key start event (i.e., when the engine 12 is started via the electric starter motor that is provided on any modern non-hybrid engine) the inertias of the components that are to be driven by the belt 20, in combination with the abrupt generation of torques as combustion is initiated in the cylinders of the engine 12, may result in the tensioner arm 32 lifting off its stop 62 and the tensioner arm 30 engaging its stop surface 64 during the key start event.

During an MGU start event (i.e., when the engine 12 is started via the belt 20 by operation of the MGU 18a as a motor), the MGU 18a generates a torque that varies depending on the type of engine and the specific details of the application. In other words, the quickness of the ramp up for the MGU 18a varies based on the application and may vary during an MGU start event. In at least some embodiments, the torque applied by the MGU 18a during an MGU start event changes the belt tension sufficiently to overcome the preload on the tensioner arm 32, thereby lifting the arm 32 off of the stop 62 (i.e., lifting the arm 32 away from the stop surface 66) and for the tensioner arm 30 to engage its stop 60 (i.e., to engage the stop surface 64).

During a boost event (i.e., when the engine 12 is operating but is assisted via the belt 20 by operation of the MGU 18a as a motor), the MGU 18a can generate a varying boost torque based on how much boost is called for by the driver's depression of the accelerator pedal, among other things. It has been determined that, for at least some embodiments, if the MGU torque is less than about 10 Nm, then there does not need to be a change in belt tension (i.e., the belt tension throughout the belt 20 is sufficient even without engagement of the arm 30 on the stop 60), whereas if the MGU torque is greater than about 10 Nm, then it is preferable to shift the tensioner arms 30 and 32 such that the tensioner arm 30 is against the stop 60. By setting the preload torque on the tensioner arm 32 to be less than about 10 Nm, (e.g., about 3 to about 5 Nm), the arms 30 and 32 are ensured of switching over to the position shown in FIG. 5c with an MGU torque of about 10 Nm.

In terms of torsional vibrations, it has been found that it is advantageous to ensure that any torsional vibrations in the endless drive arrangements 10 do not result in accelerations of a pulley (and therefore the belt 20) of more than about 1500 radians/s^2. In some embodiments, where torsional vibrations can exceed this value (or some other selected value), it may be desirable to provide an isolator on the MGU pulley 24a in order to reduce the severity of any torsional vibrations. Additionally, damping that is provided to resist movement of the tensioner arms 30 and 32 can be provided in order to reduce torsional vibrations.

Providing a non-zero preload torque, as has been described above, may be considered as a kind of filtering structure, in the sense that the tensioner 25 remains in a position with the second tensioner arm 32 against the stop 62 until a transient torque event is sufficiently higher than the preload torque, at which point the tensioner 25 moves so that the first arm 30 is against the stop 60. For example, in some embodiments if the torque on the second tensioner arm 32 is more than 1 Nm greater than the preload torque then the tensioner 25 may move to bring the first arm 30 against the stop 60 (and to cause the second arm 32 to be spaced from the stop 62). In some other embodiments, the torque on the second arm 32 may need to be more than the preload torque by 2 Nm, or by some other value in order to bring the first tensioner arm 30 against the stop 60. For completeness, it will be noted that, if during the transient event the torque is greater than the preload torque, but is not sufficiently higher to bring the first tensioner arm 30 against the stop 60, this corresponds to a narrow window (identified above as the third range of operating conditions), in which the tensioner arms 30 and 32 are not against either of the stops 60 and 62. This filtering aspect of the tensioner 25 may be described as follows: The second tensioner arm 32 has a non-zero preload torque from a combination of torques applied by at least the endless drive member 20 and the tensioner biasing member 41, wherein the preload torque urges the second tensioner arm 32 into engagement with the second tensioner arm stop surface 66 such that, when the endless drive arrangement 10 operates in the first or second mode, the second tensioner arm 32 remains engaged with the second tensioner arm stop surface 66 and the first tensioner arm 30 remains spaced from the first tensioner arm stop surface 60 throughout operation of the engine 12 where transient torque on the second tensioner arm 32 acts against the preload torque but is below the preload torque, and wherein, when the endless drive arrangement 10 operates in the first or second mode, the first tensioner arm 30 remains engaged with the first tensioner arm stop surface 60 and the second tensioner arm 32 remains spaced from the second tensioner arm stop surface 66 throughout operation of the engine 12 where transient torque on the second tensioner arm 32 acts against the preload torque and is sufficiently above the preload torque. The first mode may in some embodiments include when the engine 12 is at constant RPM at idle.

The stop 62 and the optionally provided stop 60 may be made from a material that is suitably resistant to wear and fracture. A suitable material may be, for example, Hytrel™, by E.I. Dupont de Nemours. The material may have a hardness in a range of about 25 Shore D to about 75 Shore D. It will be noted that, during operation, the stop 62 (and the optional stop 60) have some amount of compliance, in the sense that, during use, while the second tensioner arm 32 is engaged with the stop 62, there may be some small amount of displacement as the hub load (i.e., the combination of T2 and T3 acting on the pulley 28) varies due to changes in the operating conditions of the engine. As a result, because of the compliance that is present in the stop 62, the tensioner arm 32 may undergo a range of displacement of between about 0.15 mm to about 2.25 mm for applied loads of up to about 3000 N against the stop 62 or 60 as the case may be. Example spring rates that have been determined to be effective are between about 4000 N/mm to about 10000 N/mm of travel. The displacement of the second tensioner arm 32 while against the stop 62 (and, similarly, the displacement of the arm 30 while against the stop 60) is so small that it is considered negligible in terms of energy lost to movement of the arm. Additionally, such displacement is so small that any sound generated from this movement is inaudible to occupants inside the vehicle. Accordingly, it can be said that the tensioner arm 32 is substantially stationary. By contrast, the movement that occurs in some tensioner arms of some prior art tensioners that do not incorporate stops can be 20 mm to 30 mm (which corresponds to about 20 degrees to about 30 degrees of angular travel) or even more in some instances, thereby expending significant amounts of energy in the movement of these tensioner arms, and generating sounds that are audible to vehicle occupants in some instances. Furthermore, the high accelerations that occur for the tensioner arms of certain prior art tensioners causes tremors that could be felt by vehicle occupants, whereas the accelerations seen when the overall movement is kept below about 2.25 mm are sufficiently low that such tremors are undetectable by vehicle occupants. It is important for sounds and tremors associated with movement of the tensioner to not be detectable as this can affect the perception of quality of the vehicle by the vehicle occupants. Furthermore, by keeping the total movement down to less than about 2.25 mm while the tensioner arm 32 (or 30) against its stop 62 (or 60) the accelerations and therefore the corresponding stresses in the arm 32 (or 30) and associated components have been reduced such that they have no negative impact on the longevity of the tensioner. By contrast, the accelerations that have been seen in some prior art tensioners have reached levels where the elements of the tensioner are subjected to fatigue and therefore premature failure.

While it is beneficial to keep the amount of travel small, some amount of compliance in the stops 62 and 60 is desirable. Such compliance is valuable as it reduces the severity of the impact between the second tensioner arm 32 and the stop 62 (or between the first tensioner arm 30 and the stop 60) during a transition from one set of conditions to another. If the stops 62 and 60 were too rigid, such impacts could result in an audible click that could be heard (and possibly felt) by vehicle occupants, which would detract from their perception of vehicle quality. Furthermore, such impacts could result in hub load spikes and could negatively affect the life of the components. It has been found that, for impact speeds of up to 50 rad/s in combination with compliance levels as described above (i.e., the hardnesses and/or spring rates described above) the impact stresses and impact noise and vibration have been sufficiently low to not harm longevity of the components and to not be detectable by vehicle occupants. A preferred maximum speed for the tensioner arm 32 at impact with the stop 62 is about 25 rad/s, for a stop having the compliance levels described above.

In order to design the tensioner, a tensioner manufacturer may be provided with certain data from a vehicle manufacturer, such as the positions of the pulleys that make up the front engine accessory drive system, the torque required to start the engine via the belt 20, and various other design parameters. The tensioner manufacturer can determine a suitable belt tension that would be sufficient to drive the crankshaft to start the engine from the MGU. This belt tension can be used to determine the spring force that can be applied to drive the tensioner pulleys 26 and 28 into the belt 20 with sufficient force to achieve the selected belt tension. Using these values, the resulting torques on the tensioner arms 30 and 32 can be determined based on different positions of the arms 30 and 32. When the resulting torque is proximate a selected value, such as a selected value that is within a range of about 1 Nm and about 15 Nm, the stop 62 can be selectively positioned to abut the tensioner arm 32 at that point.

The wrap angle of the belt 20 on the first and second tensioner arm pulleys 26 and 28 directly impacts the belt tension. By selecting a relatively shallow wrap angle, the resulting amount of biasing torque that urges the second tensioner arm 32 into the stop 62 is kept relatively small, while maintaining a selected tension in the belt 20 that is sufficient to transmit drive torque from the engine to the accessories while preventing belt squeal, during events such as a key-start. The wrap angle is preferably also not so small that it risks the occurrence of bearing hoot during operation of the engine. Hoot is a type of undesirable noise that occurs when the wrap angle of a belt on a pulley is so low that there is not sufficient frictional engagement between the rolling elements (e.g. the balls) of a bearing and the corresponding bearing races to cause the rolling elements to roll. Instead there is sliding movement of the rolling elements on the races. By ensuring that the wrap angle is sufficiently high, such as, above about 10 degrees, hoot can be substantially eliminated. By keeping the wrap angle below a selected value, such as about 90 degrees, the preload of the tensioner arm 32 against the stop 62 is kept sufficiently low that standard bearings and the like may be used on the pulley 28. In some embodiments, the wrap angle of the belt 20 on the pulley 28 (and on the pulley 26) is between about 25 degrees and about 60 degrees.

As can be seen from the description above, under static equilibrium, the second tensioner arm 32 has been described as having a preload torque resulting from a combination of torques applied by at least the endless drive member 20 and the tensioner biasing member 41, wherein the preload torque urges the second tensioner arm 32 into engagement with the second tensioner arm stop surface 66 and is between about 1 Nm and about 15 Nm. Furthermore, the second tensioner pulley 28 is engaged with the endless drive member 20 while the second tensioner arm 32 is engaged with the second tensioner arm stop surface 66 throughout a first selected range of operating conditions, which include, for example, conditions in which: the crankshaft pulley 16 drives the endless drive member 20, the secondary drive device 18a (e.g. the MGU) does not drive the endless drive member 20. In some embodiments, the preload torque is between about 3 Nm and about 5 Nm. As can be seen from the description above, the tensioner biasing member 41 may in some embodiments be positioned to apply a torque to the second tensioner arm 32 (by way of the force FL) that is opposed to a torque exerted on the second tensioner arm 32 by the endless drive member 20 (by way of the tensions T2 and T3), during use. In some embodiments, the first tensioner arm stop surface 64 is provided and is positioned to limit the movement of the first tensioner arm 30 in a direction opposite the first free arm direction. The first tensioner arm stop surface 64 is positioned such that, in use, the first tensioner pulley 26 is engaged with the endless drive member 20 while the first tensioner arm 30 is engaged with the first tensioner arm stop surface 64 throughout a second selected range of operating conditions that is different from the first range of operating conditions. For example, in the second selected set of operating conditions: the secondary drive device pulley 24a drives the endless drive member 20, the crankshaft pulley 16 may optionally drive the endless drive member 20, and substantially any transient torque on the first tensioner arm 32 that oppose the preload torque is greater than the preload torque. Furthermore, in use, it is optionally possible for the first and second tensioner pulleys to be engaged with the endless drive member while the first and second tensioner arms are disengaged from the first and second tensioner arm stop surfaces throughout a third selected range of operating conditions that is different from the first and second ranges of operating conditions.

As described above, in some embodiments, the endless drive arrangement is operable in a first mode (FIGS. 5a and 5b) in which the crankshaft pulley 16 drives the endless drive member 20 and the secondary drive device 18a (such as an MGU) does not drive the endless drive member 20 such that tension in a first span 20-3 of the endless drive member 20 is lower than tension in a second span 20-4 of the endless drive member 20, and in a second mode (FIG. 5c) in which the secondary drive device 18a drives the endless drive member 20. In some instances during the second mode, (e.g. during a BAS event), the crankshaft pulley 16 does not drive the endless drive member 20. In some instances of the second mode (e.g. during a boost event), the crankshaft pulley 16 drives the endless drive member 20 along with the secondary drive device 18a. The first and second tensioner arm stop surfaces 64 and 66 are positioned such that, in use, at least some of the time that the endless drive arrangement operates in the first mode the second tensioner arm 32 is engaged with the second tensioner arm stop surface 66 and the first tensioner arm 30 is spaced from the first tensioner arm stop surface 64, and at least some of the time that the endless drive arrangement operates in the second mode, the second tensioner arm 32 is spaced from the second tensioner arm stop surface 66 and the first tensioner arm 30 is engaged with the first tensioner arm stop surface 64. In some embodiments, the first and second tensioner arm stop surfaces 64 and 66 are positioned such that, in use, substantially all of the time that the endless drive arrangement operates in the first mode, the second tensioner arm 32 is engaged with the second tensioner arm stop surface 66 and the first tensioner arm 30 is spaced from the first tensioner arm stop surface 64. In some embodiments, the first and second tensioner arm stop surfaces are positioned such that, in use, some of the time that the endless drive arrangement operates in the second mode (e.g. during boost events wherein the amount of torque being delivered by the secondary drive device 18a is small enough to generate a torque on the second tensioner arm 32 that is below the amount of preload torque in the second tensioner arm 32), the second tensioner arm 32 is engaged with the second tensioner arm stop surface 66 and the first tensioner arm 30 is spaced from the first tensioner arm stop surface 64.

While the description contained herein constitutes a plurality of embodiments of the present invention, it will be appreciated that the present invention is susceptible to further modification and change without departing from the fair meaning of the accompanying claims.

The invention claimed is:

1. A tensioner for tensioning an endless drive arrangement on an engine including a crankshaft pulley driven by a crankshaft, a motor/generator unit (MGU) pulley, and an endless drive member entrained about the crankshaft pulley and the MGU pulley, wherein the endless drive arrangement is operable in a first mode in which the crankshaft pulley drives the endless drive member and the MGU pulley does not drive the endless drive member such that tension in a first span of the endless drive member is lower than a second span of the endless drive member, and wherein the endless drive member is operable in a second mode in which the MGU pulley drives the endless drive member in isolation or in conjunction with the crankshaft pulley, the tensioner comprising:
   a first tensioner arm which has a first tensioner pulley rotatably mounted thereto for rotation about a first tensioner pulley axis, wherein the first tensioner pulley is configured for engagement with the first span of the endless drive member and wherein, in use, the first tensioner pulley axis travels along an orbital path;
   a second tensioner arm which has a second tensioner pulley rotatably mounted thereto for rotation about a second tensioner pulley axis, wherein the second tensioner pulley is configured for engagement with the second span of the endless drive member, and wherein, in use, the second tensioner pulley axis travels along an orbital path;
   a tensioner biasing member that is positioned to bias the first and second tensioner arms in a first free arm direction and in a second free arm direction, respectively; and
   a second tensioner arm stop surface that is positioned to limit the movement of the second tensioner arm in a direction opposite the second free arm direction,
   wherein, under static equilibrium, due at least to the wrap of the endless drive member about the first and second tensioner pulleys, and the position of the second tensioner arm stop surface, the second tensioner arm has a preload torque from a combination of torques applied by at least the endless drive member and the tensioner biasing member, wherein the preload torque urges the second tensioner arm into engagement with the second tensioner arm stop surface and is between about 1 Nm and about 15 Nm such that, in use, the second tensioner pulley is engaged with the endless drive member while the second tensioner arm is engaged with the second tensioner arm stop surface in the first mode of operation and in the second mode of operation unless a transient torque acting opposite the preload torque exceeds the magnitude of the preload torque by a sufficient amount,
   wherein the first tensioner arm stop is positioned such that, when tension in the endless drive member is sufficient to drive the second tensioner arm into engagement with the second tensioner arm stop, the first tensioner arm stop is spaced from the first tensioner arm,
   and wherein the second tensioner arm stop is positioned such that, when tension in the endless drive member is sufficient to drive the first tensioner arm into engagement with the first tensioner arm stop, the second tensioner arm stop is spaced from the second tensioner arm.

2. A tensioner as claimed in claim 1, wherein the endless drive member is configured to engage each of the first and second tensioner arm pulleys over a wrap angle that is between about 10 degrees and about 90 degrees.

3. A tensioner as claimed in claim 1, wherein the tensioner biasing member is a compression spring.

4. A tensioner as claimed in claim 1, wherein the tensioner biasing member is positioned to apply a torque to the second tensioner arm that is opposed to a torque exerted on the second tensioner arm by the endless drive member, in use.

5. A tensioner as claimed in claim 1, further comprising a first tensioner arm stop surface that is positioned to limit the movement of the first tensioner arm in a direction opposite the first free arm direction, wherein the first tensioner arm stop surface is positioned such that, in use, the first tensioner pulley is engaged with the endless drive member while the first tensioner arm is engaged with the first tensioner arm stop surface in the second mode of operation when a transient torque acting opposite the preload torque exceeds the magnitude of the preload torque by a sufficient amount.

6. A tensioner as claimed in claim 1, wherein the preload torque is between about 3 Nm and about 5 Nm.

7. An endless drive arrangement, comprising:
   a crankshaft;
   a secondary drive device;
   an endless drive member connecting the crankshaft and the secondary drive device;
   a tensioner, including
      a first tensioner arm that has a first tensioner pulley rotatably mounted thereto, wherein the first tensioner pulley is engaged with a first span of the endless drive member on a first side of the secondary drive device, and wherein, in use, the first tensioner arm moves to and fro;
      a second tensioner arm that has a second tensioner pulley rotatably mounted thereto, wherein the second tensioner pulley is engaged with a second span of the endless drive member on a second side of the secondary drive device, and wherein, in use, the second tensioner arm moves to and fro;
      a tensioner biasing member that is positioned to apply a tensioner biasing force to bias the first and second tensioner arms in respective first and second free arm directions; and
      a second tensioner arm stop that is positioned to limit the movement of the second tensioner arm in a direction opposite the second free arm direction,
      wherein, under static equilibrium, the second tensioner arm has a preload torque from a combination of torques applied by at least the endless drive member and the tensioner biasing member, wherein the preload torque urges the second tensioner arm into engagement with the second tensioner arm stop surface such that, in use, the second tensioner pulley is engaged with the endless drive member while the second tensioner arm is engaged with the second tensioner arm stop surface in operational modes wherein the crankshaft pulley exclusively drives the endless drive member or wherein the secondary drive device drives the endless drive member, unless a transient torque acting opposite the preload torque exceeds the magnitude of the preload torque by a sufficient amount, wherein the first tensioner arm stop is positioned such that, when tension in the endless drive member is sufficient to drive the second tensioner arm into engagement with the second tensioner arm stop, the first tensioner arm stop is spaced from the first tensioner arm, and wherein the second tensioner arm stop is positioned such that, when tension in the endless drive member is sufficient to drive the first tensioner arm into engagement with the first tensioner arm stop, the second tensioner arm stop is spaced from the second tensioner arm.

8. An endless drive arrangement as claimed in claim 7, wherein the secondary drive device is a motor-generator unit.

9. An endless drive arrangement as claimed in claim 7, wherein the secondary drive unit is configured to apply a secondary drive unit torque to the endless drive member in a direction that is opposed to a crankshaft torque that is applied to the endless drive member.

10. An endless drive arrangement as claimed in claim 7, wherein the first tensioner arm pivots about a first tensioner arm axis and the second tensioner arm pivots about a second tensioner arm axis, wherein the first tensioner pulley is on a first side of the first tensioner arm axis, and the tensioner biasing member is positioned to apply the tensioner biasing force on a second side of the first tensioner arm axis, and wherein the second tensioner pulley is on a first side of the second tensioner arm axis, and the tensioner biasing member is positioned to apply the tensioner biasing force on a second side of the second tensioner arm axis.

11. An endless drive arrangement for an engine, comprising:
a crankshaft pulley connected to a crankshaft;
a secondary drive device pulley connected to a shaft of a secondary drive device;
an endless drive member that is engaged with the crankshaft pulley and with the secondary drive device pulley, wherein the endless drive arrangement is operable in a first mode in which the crankshaft pulley drives the endless drive member and the secondary drive device pulley does not drive the endless drive member such that tension in a first span of the endless drive member is lower than tension in a second span of the endless drive member, and in a second mode in which the secondary drive device pulley drives the endless drive member in isolation or in addition to the crankshaft pulley; and
a tensioner, including
a first moveable tensioner arm that has a first tensioner pulley rotatably mounted thereto, wherein the first tensioner pulley is engaged with the first span of the endless drive member,
a second tensioner arm that has a second moveable tensioner pulley rotatably mounted thereto, wherein the second tensioner pulley is engaged with the second span of the endless drive member,
a tensioner biasing member that is positioned to bias the first and second tensioner arms in respective first and second free arm directions,
a first tensioner arm stop surface that is positioned to limit the movement of the first tensioner arm in a direction opposite the first free arm direction, and
a second tensioner arm stop surface that is positioned to limit the movement of the second tensioner arm in a direction opposite the second free arm direction, wherein the second tensioner arm has a preload torque in static equilibrium arising from a combination of torques applied by at least the endless drive member and the tensioner biasing member, wherein the preload torque urges the second tensioner arm into engagement with the second tensioner arm stop surface such that, when the endless drive arrangement operates in the first or second mode, the second tensioner arm remains engaged with the second tensioner arm stop surface and the first tensioner arm remains spaced from the first tensioner arm stop surface where transient torque on the second tensioner arm acts against the preload torque but is below the preload torque, and wherein, when the endless drive arrangement operates in the first or second mode, the first tensioner arm remains engaged with the first tensioner arm stop surface and the second tensioner arm remains spaced from the second tensioner arm stop surface where transient torque on the second tensioner arm acts against the preload torque and is sufficiently above the preload torque, wherein the first tensioner arm stop is positioned such that, when tension in the endless drive member is sufficient to drive the second tensioner arm into engagement with the second tensioner arm stop, the first tensioner arm stop is spaced from the first tensioner arm, and wherein the second tensioner arm stop is positioned such that, when tension in the endless drive member is sufficient to drive the first tensioner arm into engagement with the first tensioner arm stop, the second tensioner arm stop is spaced from the second tensioner arm.

12. An endless drive arrangement as claimed in claim 11, wherein the preload torque is between about 1 Nm and about 15 Nm.

13. An endless drive arrangement as claimed in claim 11, wherein the first and second tensioner arms pivot about first and second tensioner arm axes, the first tensioner pulley is disposed on a first side of the first tensioner arm axis, and the tensioner biasing member is positioned to apply the tensioner biasing force on a second side of the first tensioner arm axis, and wherein the second tensioner pulley is on a first side of the second tensioner arm axis, and the tensioner biasing member is positioned to apply the tensioner biasing force on a second side of the second tensioner arm axis and wherein the configuration of the first and second tensioner arms, the positions of the first and second tensioner arm axes, the wrap of the endless drive member about the first and second tensioner pulleys, and the torques applied by at least the endless drive member and the tensioner biasing member are such that, under static equilibrium:

$$\frac{TR}{TL} > \frac{hF2}{hF1}$$

where $TR = TR2 - TR3,$ $TL = TR4 - TR5,$

TR2 = the moment arm relative to the second tensioner arm axis of a force T2 exerted on the second tensioner pulley by a first portion of the second span of the endless drive member, TR3=the moment arm relative to the second tensioner arm axis of a force T3 exerted on the second tensioner pulley by a second portion of the second span of the endless drive member, TR4=the moment arm relative to the first tensioner arm axis of a force T4 exerted on the first tensioner pulley by a first portion of the first span of the endless drive member, TR5=the moment arm relative to the second tensioner arm axis of a force TS exerted on the first tensioner pulley by a second portion of the first span of the endless drive member, hF1=the moment arm relative to the first tensioner arm axis of a force FL exerted on the first tensioner arm by the tensioner biasing member, and hF2=the moment arm relative to the second tensioner arm axis of the force FL exerted on the second tensioner arm by the tensioner biasing member.

\* \* \* \* \*